(12) United States Patent
Lee

(10) Patent No.: US 8,423,743 B2
(45) Date of Patent: Apr. 16, 2013

(54) METHOD TO DIVIDE A FILE OR MERGE FILES USING FILE ALLOCATION TABLE (FAT)

(75) Inventor: Jeong-hun Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 782 days.

(21) Appl. No.: 12/034,742

(22) Filed: Feb. 21, 2008

(65) Prior Publication Data
US 2009/0070542 A1 Mar. 12, 2009

(30) Foreign Application Priority Data

Sep. 11, 2007 (KR) .............................. 10-2007-92311

(51) Int. Cl.
*G06F 12/00* (2006.01)
(52) U.S. Cl.
USPC .................... 711/170; 711/103; 711/E12.001
(58) Field of Classification Search .................. 711/103, 711/112, 170, 173, 205, E12.001
See application file for complete search history.

(56) References Cited

U.S. PATENT DOCUMENTS

| | | | | |
|---|---|---|---|---|
| 6,202,121 | B1 * | 3/2001 | Walsh et al. | 711/100 |
| 7,664,912 | B2 * | 2/2010 | Ito et al. | 711/112 |
| 7,747,664 | B2 * | 6/2010 | Patel et al. | 707/826 |
| 2006/0206681 | A1 * | 9/2006 | Suzuki et al. | 711/170 |
| 2006/0250721 | A1 * | 11/2006 | Suzuki et al. | 360/46 |
| 2007/0266221 | A1 * | 11/2007 | Kagatsume et al. | 711/205 |
| 2007/0279787 | A1 * | 12/2007 | Ito et al. | 360/48 |
| 2008/0141029 | A1 * | 6/2008 | Culver | 713/165 |
| 2008/0177939 | A1 * | 7/2008 | Patel et al. | 711/103 |
| 2008/0222207 | A1 * | 9/2008 | Ito | 707/200 |
| 2009/0067241 | A1 * | 3/2009 | Gorobets et al. | 365/185.04 |

FOREIGN PATENT DOCUMENTS

JP 2001056774 A * 2/2001

* cited by examiner

*Primary Examiner* — Pierre-Michel Bataille
(74) *Attorney, Agent, or Firm* — Stanzione & Kim, LLP

(57) ABSTRACT

A method to divide a file or merge files using a file allocation table (FAT) in which the method to divide a file includes storing data of a first cluster, among data intended to be separated from the file, into a second cluster, and generating a first cluster chain and a second cluster chain using a file allocation table (FAT), the first cluster chain containing data remaining in the first cluster, and the second cluster containing data existing in the second cluster. As a result, time delay due to a file copy process and shortening of a lifespan of NAND flash are prevented, and a reserve capacity for editing purposes is minimized.

19 Claims, 7 Drawing Sheets

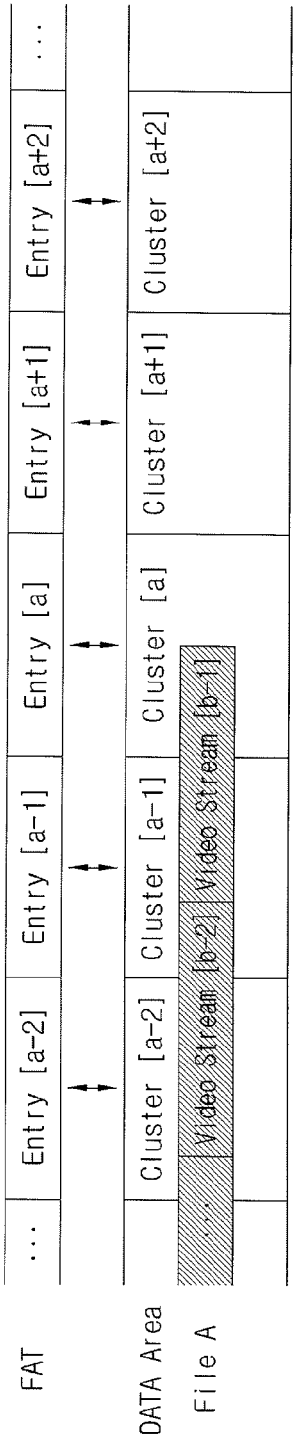
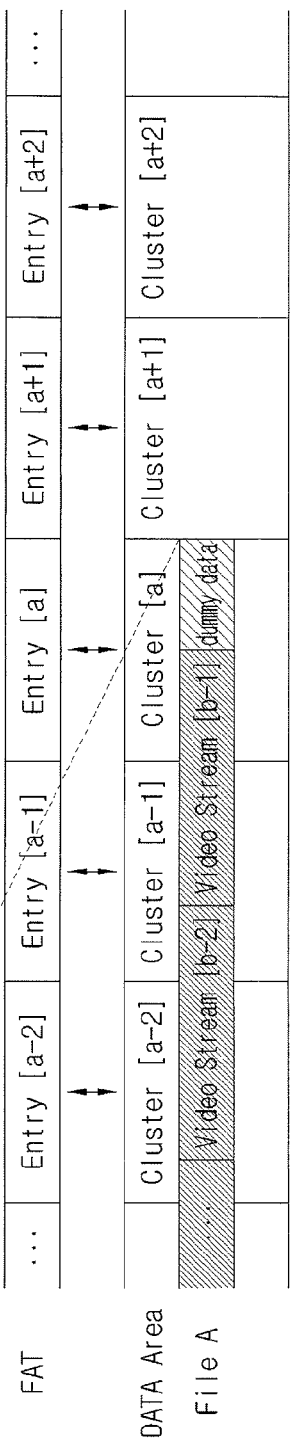
FIG. 4A
FIG. 4B

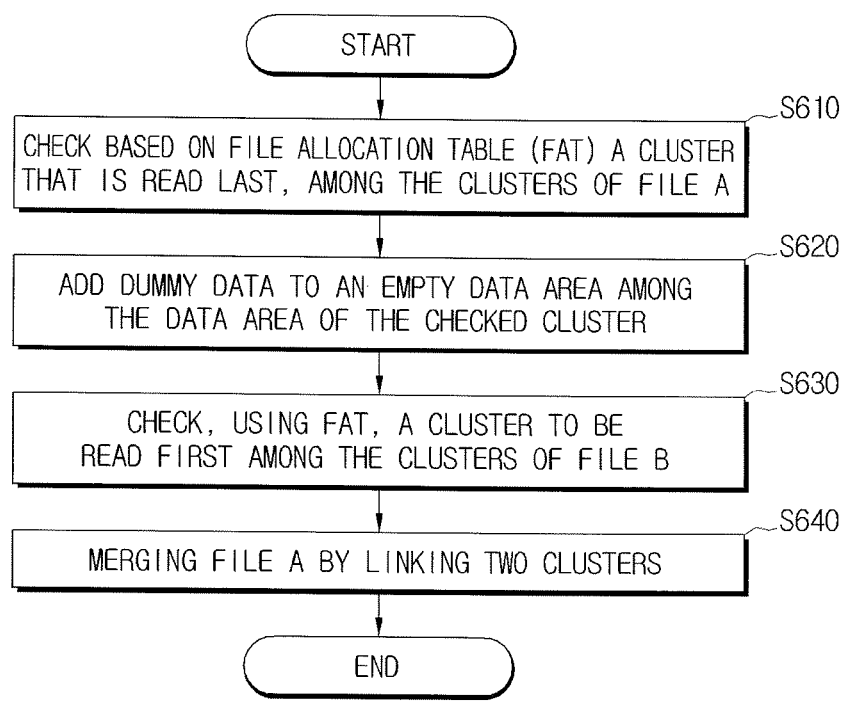

METHOD TO DIVIDE A FILE OR MERGE FILES USING FILE ALLOCATION TABLE (FAT)

CROSS-REFERENCE TO RELATED APPLICATIONS

This application claims priority under 35 U.S.C. §119 (a) from Korean Patent Application No. 10-2007-0092311, filed on Sep. 11, 2007, in the Korean Intellectual Property Office, the disclosure of which is incorporated herein by reference in its entirety.

BACKGROUND OF THE INVENTION

1. Field of the Invention

The present general inventive concept relates to a method to divide a file or merge files, and more particularly, to a method to divide or merge files using a file allocation table (FAT).

2. Description of the Related Art

People now enjoy diversifications of videos and audios, as digital technology have been incorporated into data storage electronic devices. Electronic devices are no longer limited to a function of storing contents, but are also able to provide extensions of functions such as management or editing of the stored contents. And yet more and more diverse ways of management and editing are being provided.

Users want to store a vast volume of data stored in an electronic device and to edit the stored data according to preferences thereof. Fast editing and large storage capacity are thus considered by the customers as important factors to consider before choosing the electronic device.

As users want to store greater amounts of data and to edit the stored data at a faster speed, a method to edit a file to ensure more space of a storage device and faster data editing is required.

SUMMARY OF THE INVENTION

The present general inventive concept provides a method to divide or merge a file using a file allocation table (FAT) to edit a file efficiently.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept may be achieved by providing a method to divide a file, the method including storing data of a first cluster, among data intended to be separated from the file, into a second cluster, and generating a first cluster chain and a second cluster chain using a file allocation table (FAT), the first cluster chain containing data remaining in the first cluster, and the second cluster containing data existing in the second cluster.

The first cluster may be set by the FAT to be read first among clusters containing the data intended to be separated.

The second cluster may be a newly allocated cluster.

The generating may include setting so that the first cluster chain finishes with the first cluster.

The generating may include linking the second cluster with a third cluster so that the second cluster chain starts with the second cluster, and the third cluster, which is linked to be read next to the first cluster, is read after the reading of the second cluster.

The linking may include linking the second cluster with the third cluster by storing information about the third cluster to an entry to match the second cluster in the FAT.

The method to divide a file may further include deleting the stored data from the first cluster, and adding dummy data to the deleted portion.

The method to divide a file may further include filling in an area of the second cluster with the dummy data, excluding an area having the stored data.

The foregoing and/or other aspects and utilities of the present general inventive concept may be achieved by providing a method to merge files, the method including adding dummy data to an empty data area of a data area to correspond to a first cluster, the first cluster being set by a file allocation table (FAT) to be read last, and linking the first cluster with a second cluster using the FAT so that the second cluster is read after the reading of the first cluster.

The linking may include linking the first cluster with the second cluster by storing information about the second cluster in an entry to match the first cluster based on the FAT.

The second cluster may be set to be read first among clusters of a file being merged with an original file.

The adding the dummy data may include aligning the data area and the first cluster by adding the dummy data to an empty data area among the data area to correspond to the first cluster.

The foregoing and/or other aspects and utilities of the general inventive concept may also be achieved by providing a method to divide a file having one or more video streams stored across a plurality of clusters, the method including identifying the clusters storing the respective video streams of the file to be divided, selectively copying, for each of the identified clusters, a portion of the cluster corresponding to the respective video stream to a new cluster, and creating entries in a file allocation table to allow the video streams of the divided file to be read in a proper order.

The method may further include deleting from the identified clusters, the portions copied to the new clusters, respectively, after the copying operation.

The method may further include adding dummy data to a remaining area in the new clusters.

The foregoing and/or other aspects and utilities of the general inventive concept may also be achieved by providing a computer-readable recording medium having embodied thereon a computer program to execute a method, wherein the method includes identifying clusters storing respective video streams of a file to be divided, selectively copying, for each of the identified clusters, a portion of the cluster corresponding to the respective video stream to a new cluster, and creating entries in a file allocation table to allow the video streams of the divided file to be read in a proper order.

The foregoing and/or other aspects and utilities of the general inventive concept may also be achieved by providing an electronic device including a memory including clusters to store respective video streams of a file to be divided, a control unit to selectively copy for each of the clusters, a portion of the cluster corresponding to the respective video stream to a new cluster, and a file allocation table having entries to allow the video streams of the divided file to be read in a proper order.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 4A and 4B are views illustrating a method to merge a file according to an exemplary embodiment of the present general inventive concept;

FIG. 6 is a flowchart illustrating a method to merge a file according to an exemplary embodiment of the present general inventive concept.

DETAILED DESCRIPTION OF THE PREFERRED EMBODIMENTS

Figure 1:
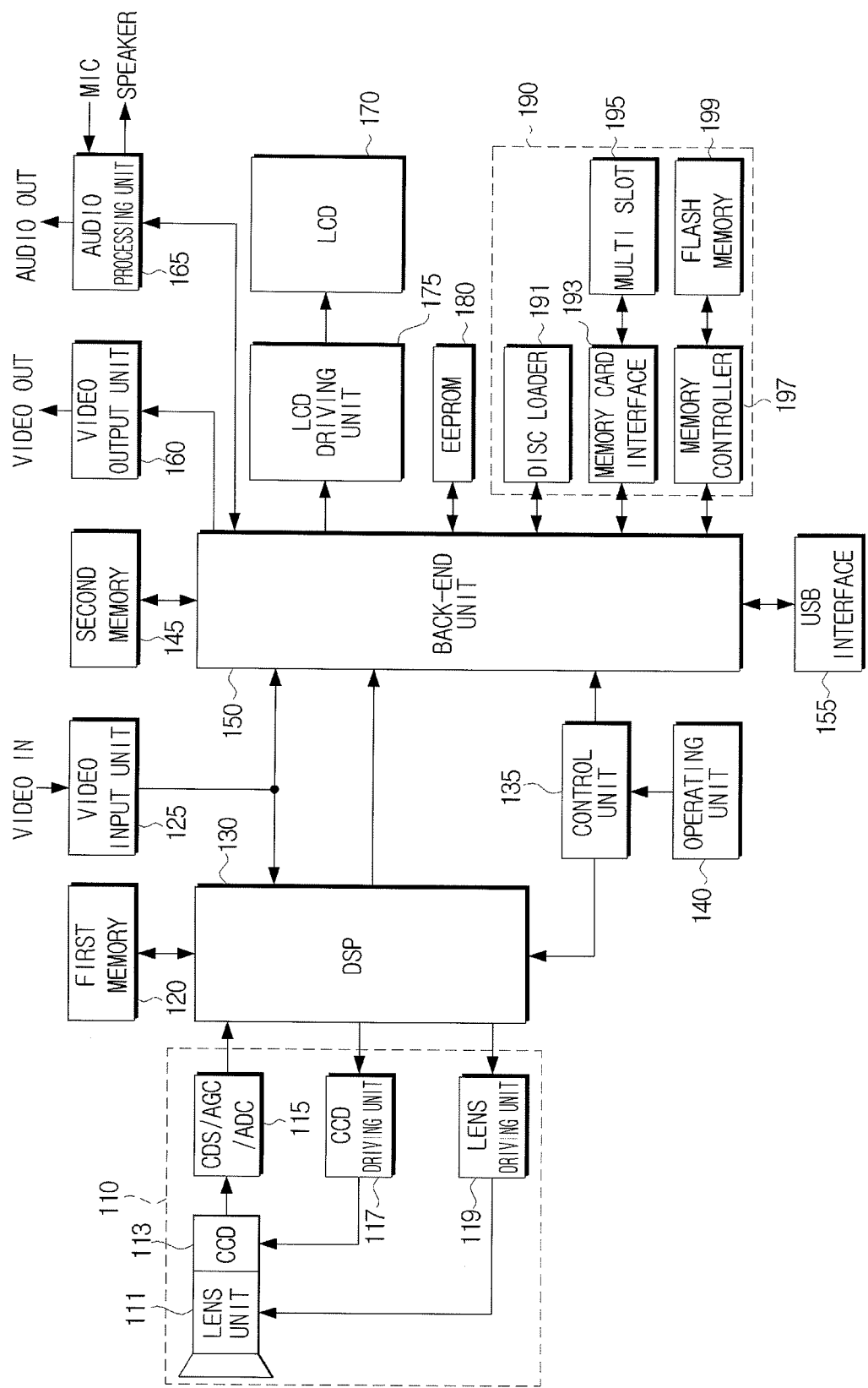
FIG. 1 is a block diagram illustrating an interior of a digital camcorder according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an interior of a digital camcorder according to an exemplary embodiment of the present general inventive concept.

Referring to FIG. 1, a digital camcorder according to an exemplary embodiment of the present general inventive concept includes a photographing unit 110, a first memory 120, a video input unit 125, a digital signal processor (DSP) 130, a control unit 135, an operating unit 140, a second memory 145, a back-end unit 150, a USB interface 155, a video output unit 160, an audio processing unit 165, a liquid crystal display (LCD) 170, a LCD driving unit 175, an electrically erasable and programmable read only memory (EEPROM) 180, and a recording unit 190.

The photographing unit 110 photoelectrically converts an optical signal being entered through a lens into an electrical signal, and processes the electrical signal. The photographing unit 110 may include a lens unit 111, a charge coupled device (CCD) 113, a correlated double sampler/auto gain controller/analog-to-digital converter (CDS/AGC/ADC) 115, a CCD driving unit 117, and a lens driving unit 119.

The lens unit 111 forms an optical image of an object being photographed on an optical plane of the CCD 113 which will be explained below.

The lens driving unit 119 drives the lens unit 111 to zoom-in and zoom-out, using the zoom-motor (not illustrated), adjusts a focal point by driving the lens unit 111 with a focus-motor, and adjusts opening degree of an iris (not illustrated) provided in the lens unit 111 by driving an iris-motor.

The CCD 113 is driven by the CCD driving unit 117, to generate and output an electric signal that corresponds to an optical image formed on the optical plane by the lens unit 111.

The CDS/AGC/ADC 117 processes an electric signal being output from the CCD 115, with the processing such as correlated double sampling (CDS), auto gain controlling (AGC), or A/D conversion.

The first memory 120 is a buffer to provide a recording space for the DSP 130 to perform video signal processing. The first memory 120 may be implemented as a flash memory and/or synchronous dynamic random access memory (SDRAM).

The video input unit 125 receives a video from an external device and transmits the received video to the DSP 130 and/or back-end unit 150.

The DSP 130 is an element to perform signal processing of an incoming video from the photographing unit 110 or the video input unit 125 and output the result to the back-end unit 150. The first memory 120 is used as a buffer when the DSP 130 processes signals.

The DSP 130 processes a video signal being output from the photographing unit 110 by performing processes such as format conversion and a digital zoom for video scale adjustment, and auto white balance (AWB). The DSP 130 then outputs the signal to the back-end unit 150. The DSP 130 controls the lens driving unit 117 to perform processing such as auto focus (AF), or auto exposure (AE).

The DSP 130 compresses a video signal being output from the photographing unit 110 into a JPEG format file that is suitable for a still video, and outputs a result to the back-end unit 150. The DSP 130 de-compresses the JPEG format file received at the back-end unit 150 and outputs the generated video signal to the back-end unit 150.

The control unit 135 controls signal processing/signal transferring of the DSP 130, and also controls the signal processing/signal transferring of the back-end unit 150 according to user operation commands being input through the operating unit 140.

The operating unit 140 includes a plurality of buttons to receive user commands.

The second memory 145 is a buffer to provide a recording space for the signal processing of the back-end unit 150. The second memory 145 records graphics, menus, and texts for the on-screen display (OSD) processing of the back-end unit 150. The second memory 145 may be implemented as a flash memory and/or SDRAM.

The back-end unit 150 performs processing of videos and/or audios, such as compression, de-compression, or replay.

The back-end unit 150 encodes video signals being input from the DSP 130 to display, and outputs the encoded video signals to the LCD 170 or the video output unit 160.

The back-end unit 150 may OSD-process graphics, menus, or texts of an incoming video from the DSP 130 and outputs a result. In this process, the back-end unit 150 retrieves graphics, menus or texts recorded in OSD information format from the second memory 145 to use in the OSD processing.

The back-end unit 150 compresses video signal received from the DSP 130 and audio signal received from the audio processing unit 165, and transmits the resultant compression files to the recording unit 190.

The back-end unit 150 de-compresses the incoming compression file from the recording unit 190 to restore the file into video and audio signals, outputs the restored video signal to the LCD 170, and outputs the restored audio signal to the audio processing unit 165.

The back-end unit 150 may OSD-process the restored video when outputting the video to the LCD 170.

Additionally, the back-end unit 150 transmits the JPEG format file received from the DSP 130 to the recording unit 190, and transmits the JPEG format file received from the recording unit 190 to the DSP 130.

The USB interface 155 provides USB communication interface between a USB device, such as PC or printer, and a digital camcorder. The video output unit 160 outputs a video signal being received from the back-end unit 150 to a connected external device such as TV.

The audio processing unit 165 performs analog-to-digital conversion of an analog audio signal being input through an audio input element such as a microphone, and transmits the resultant digital signal to the back-end unit 150. The audio processing unit 165 also performs digital-to-analog conversion of a digital audio signal being received from the back-end unit 150, and outputs the resultant analog signal to a connected external device such as a speaker.

The LCD 170 displays a video being output from the back-end unit 150 on a liquid crystal display (LCD). The LCD 170 is driven by the LCD driving unit 175.

The EEPROM 180 is a memory to record programs and data which are necessary for the back-end unit 150 to perform signal processing/signal transfer.

The recording unit 190 records the compression file being output from the back-end unit 150 to a recording medium. The recording unit 190 includes a disk loader 191, a memory card interface 193, a multi-slot 195, a memory controller 197, and a flash memory 199.

The disk loader 191 writes a compression file being input from the back-end unit 150 to a disk loaded thereon. The disk loader 191 also retrieves a compression file from the disk loaded thereon and outputs the retrieved compression file to the back-end unit 150. Discs like a compact disk (CD), digital versatile disk (DVD), Blu-ray disk (BD), high definition DVD (HD-DVD) may be implemented.

The memory card interface 193 writes the compression file being received from the back-end unit 150 to various memory cards being mounted in the multi-slot 195.

The memory card interface 193 also retrieves compression files from various memory cards mounted in the multi-slot 195, and outputs the retrieved files to the back-end unit 150. A multimedia card (MMC), or a secure digital (SD) card may be implemented as the memory card.

The memory controller 197 writes a compression file being input from the back-end unit 150 to the built-in flash memory 199. The memory controller 197 retrieves a compression file from the flash memory 199 and outputs the retrieved compression file to the back-end unit 150.

Meanwhile, the control unit 135 controls the back-end unit 150 and the recording unit 190 to write a compression file being output from the back-end unit 150 to one of the memory card and the flash memory 199. The user is able to set a recording medium to write a compression file through a menu provided by the OSD processing at the back-end unit 150.

The control unit 135 also controls file copy and file edit of the recording media built in or mounted in the recording unit 190.

The method to edit files written in the recording media based on FAT32 will be explained below with reference to FIGS. 2A to 4B.

Figures 2A, 2B:
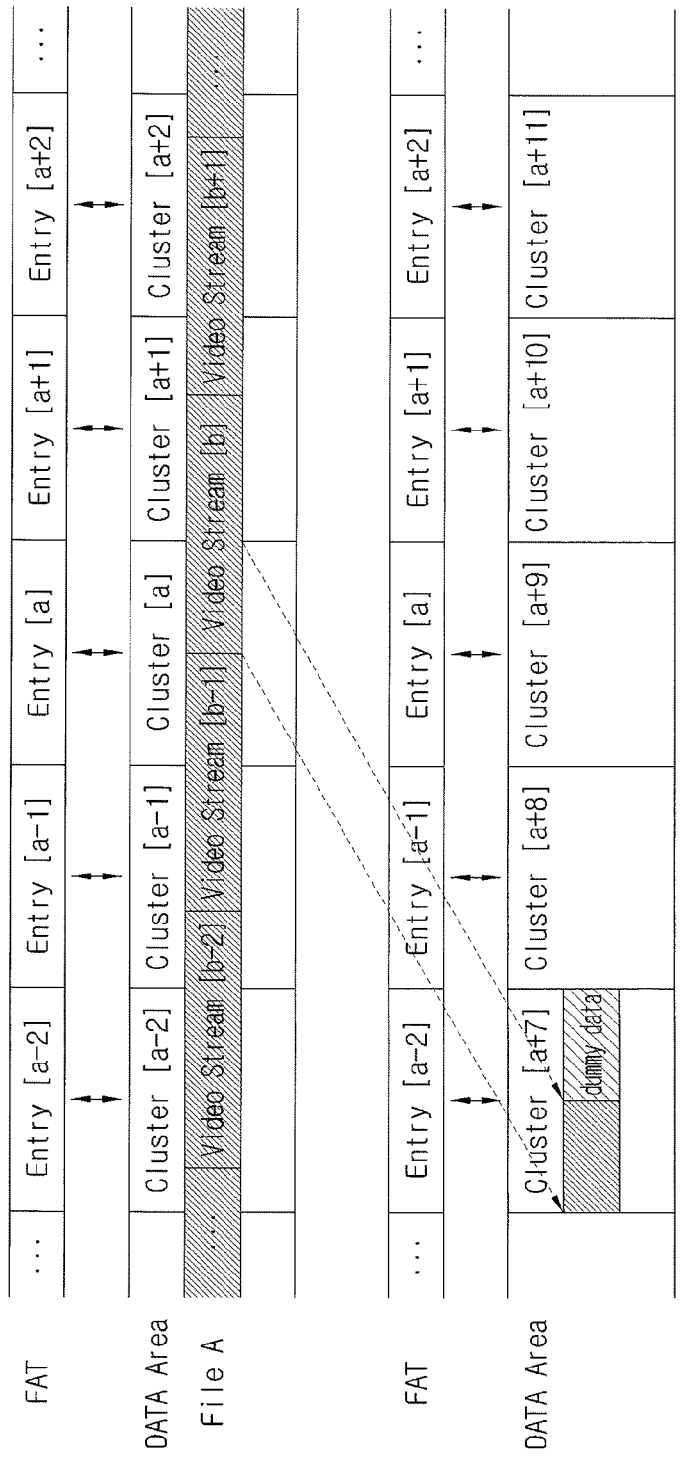
FIGS. 2A to 2C are views illustrating a file dividing according to an exemplary embodiment of the present general inventive concept.
Figure 2C:
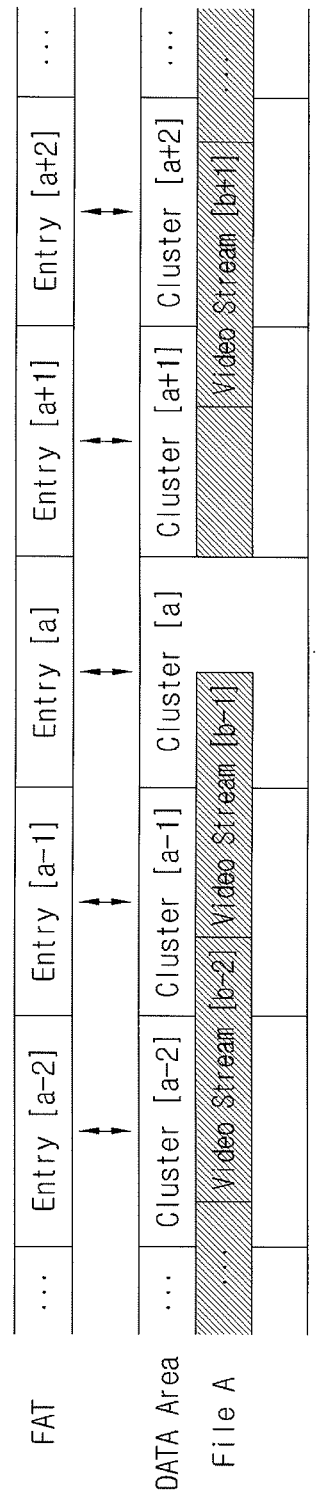

FIGS. 2A to 2C are views illustrating a method to divide a file according to an exemplary embodiment of the present general inventive concept.

Referring to FIG. 2A, a file allocation table (FAT) includes a plurality of FAT entries, and a data area having a plurality of video streams for file A.

The FAT tabulates locations and an order of clusters of files. Because a new file is written in one or more cluster, the file may be scattered among different clusters, and thus the operating system makes FAT entries to record the locations and the order of the respective clusters. A 'cluster' is a space allocation unit of a storage media for files and directories.

An FAT file system has FAT12, 16, 32, and uses one of these according to a type of the storage media. The FAT entries are divided into 12 bits for FAT12, 16 bits (2 bytes) for FAT16, and 32 bits for FAT32, respectively. Accordingly, each of the FAT entries is 4 bytes according to an exemplary embodiment of the present general inventive concept.

The data area includes a plurality of clusters to store video files therein. That is, a video file is divided into video streams and stored in a plurality of clusters.

Each of the clusters is matched with each of the FAT entries stored in the FAT. Accordingly, video streams are read out according to the 'read' order of clusters based on FAT matching.

Reading data from the storage medium using FAT based on the 'read' order of clusters will be explained below with reference to FIG. 3.

Figure 3:
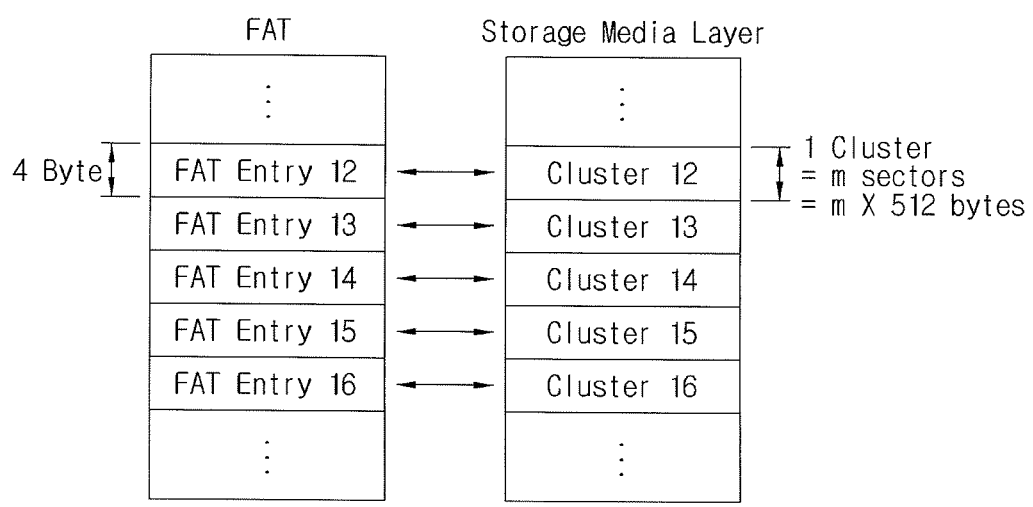
FIG. 3 is a view provided illustrating a method to read a cluster using a file allocation table (FAT) according to an exemplary embodiment of the present general inventive concept.

FIG. 3 is a view illustrating a method to read a cluster using an FAT according to an exemplary embodiment of the present general inventive concept.

Because each of the FAT entries is matched with the clusters of the data area, cluster numbers are stored to match the clusters with each other when file data is stored in a plurality of clusters.

For example, when cluster 12 is read, FAT entry 12 that matches cluster 12 is read, and FAT entry 12 provides information about a cluster to read after cluster 12.

Accordingly, by the control of the control unit 135, the above process repeats to read data according to the FAT entry information provided by the FAT.

Each of the clusters includes (m) number of sectors, and approximately m*512 bytes where variable 'm' is set by a user.

Referring back to FIG. 2A, under the control of the control unit 135, clusters associated with each of the entries are read in order according to the file 'read' information included in the entries.

In order to divide a file into two files, a user is required to copy some of the data before dividing the file, because the clusters and the video streams do not have matching alignment.

For example, if a user wants to divide a file into file A and file B with reference to a boundary between video streams [b−1] and [b], the user copies some of the data about one cluster and moves the copied data to another cluster. A method to divide a file into two files with reference to a boundary between video streams [b−1] and [b] as a divide point will be explained below with reference to FIGS. 2B and 2C.

FIGS. 2B and 2C illustrate a process of copying video streams of some portion of one cluster. The control unit 135 allocates a new cluster [a+7] to move a video steam to be copied.

Among the video streams that correspond to cluster [a] including a divide point, only the data that correspond to video stream [b] are copied onto a newly allocated cluster [a+7], and the copied data are deleted from the video stream [b] of the previous cluster [a].

Accordingly, the control unit 135 stores a portion of the video stream [b] copied from the cluster [a] into cluster [a+7], and fills a remaining area of the cluster [a+7] with dummy data. The dummy data filling in the remaining area of the cluster [a+7] are meaningless and thus can be skipped.

As a result, a video stream in the data area is divided into two portions as illustrated in FIG. 2C. While the meaningless dummy data fill in some portions of the data area of the deleted video stream [b] in FIG. 2C, filling even the deleted data area with dummy data that indicate an end of the file is possible.

The control unit 135 then links cluster [a+7] and cluster [a+1] of the FAT so that a front portion of the video stream [b] stored in cluster [a+7] is read first, followed by a tail portion of the next video stream [b]. More specifically, the control unit 135 stores information to read data from cluster [a+1] to the FAT entry [a+7] matching the cluster [a+7], so that video stream [b] can be read continuously.

As explained above, after the video stream [b] is read, some of the video stream [b+1] in a same cluster is partially read, and the video stream is read according to the next cluster information stored in FAT entry [a+1].

Accordingly, a file is divided efficiently through a cluster link that uses the FAT, because the video stream is copied from only a cluster that includes a portion intended to be divided, and not from the entire portion intended to be divided.

FIGS. 4A and 4B are views illustrating a method to merge a file according to an exemplary embodiment of the present general inventive concept.

Referring to FIG. 4A, the FAT includes a plurality of FAT entries, and a data area includes a plurality of video streams regarding file A. Because the FAT, data area and cluster are already explained above, further explanation thereof will be omitted for the sake of brevity.

Under the control of the control unit 135, clusters related with each of the entries are read in sequence according to the file 'read' information included in each of the entries.

If a user wants to merge file C into file A, the control unit 135 checks a last cluster to be read among the FAT regarding file A. Because file A finishes with the video stream [b−1], the point when video stream [b−1] finishes is used as a merge point, and cluster [a] is the last cluster to be read in the file FAT.

Because the alignment of cluster [a] does not match an alignment of the video stream [b−1], matching the alignments of the cluster [a] and the video stream [b−1] in order to merge file C is necessary.

The method of matching the alignments of the cluster [a] and the video stream [b−1] to merge file C will be explained below with reference to FIG. 4B.

Under the control of the control unit 135, dummy data are filled in an area after the merge point of cluster [a] of the original file, that is, file A.

File C can be merged when the dummy data are added and so the alignment of the data area where the file A finishes matches the alignment of the cluster [a].

The control unit 135 may merge file A with file C by linking entries [a] and [a+100] so that FAT entry [a+100] is read following the FAT entry [a] without requiring a video stream [c] located in the cluster [a+100] to be copied. More specifically, the control unit 135 controls so that the FAT entry [a] reads cluster [a+100], and the FAT entry [a+100] linked to the cluster [a+100] is read in a same manner.

As explained above, two files are merged with each other conveniently without requiring an entire portion in interest to be copied, by matching the alignment of a video stream of a last cluster of an original file and linking the clusters using FAT.

Figure 5:
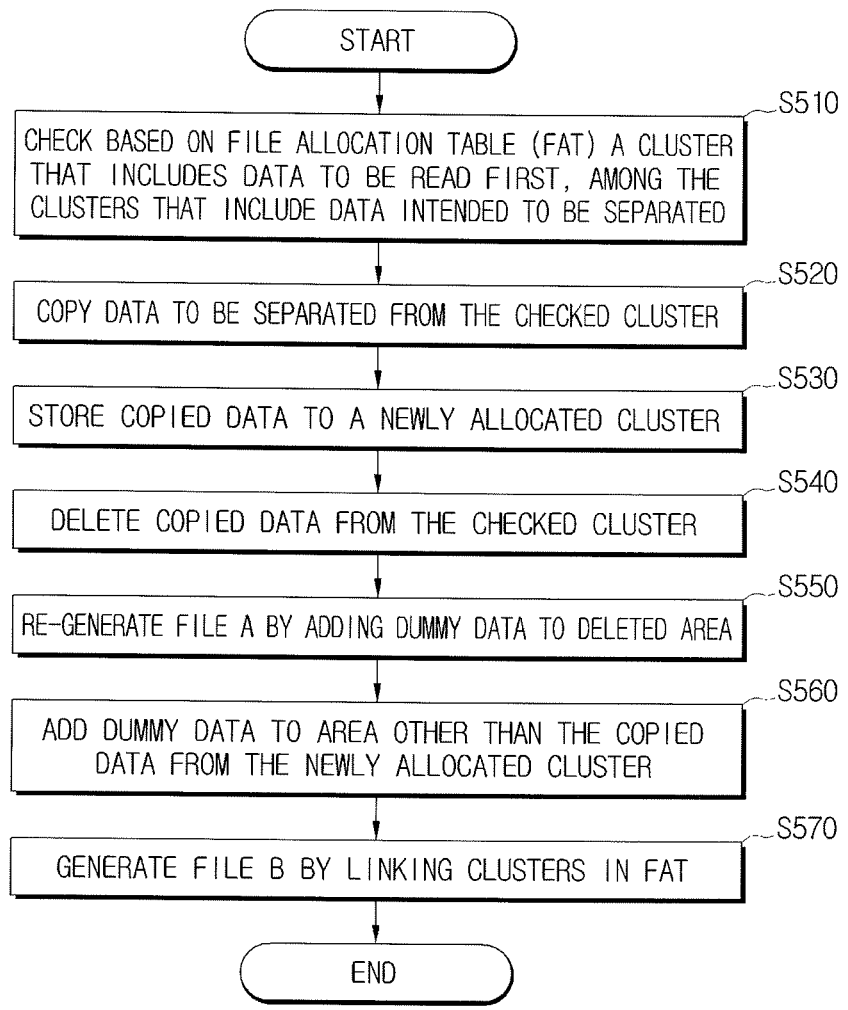
FIG. 5 is a flowchart illustrating a method to divide a file according to an exemplary embodiment of the present general inventive concept.

FIG. 5 is a flowchart illustrating a method to divide a file according to an exemplary embodiment of the present general inventive concept.

More specifically, the process of dividing file A into two files, that is, a process of regenerating the previous file A and generating a new file B, will be explained below.

In order to divide a file A, the control unit 135 in operation S510 checks the first cluster to read, among the clusters that contain data to be divided.

The control unit 135 in operation S520 copies data to be divided from the checked cluster. For example, if data after video stream [b] is the data to be divided, the control unit 135 checks the cluster [a], which is the first cluster to read among the clusters that contain data to be divided, and copies a portion of the video stream [b] stored in cluster [a].

The control unit 135 in operation S530 stores the copied data in a newly allocated cluster.

In operation S540, the control unit 135 deletes the copied data from the original cluster. As a result, data is moved from a previous cluster to a newly allocated cluster.

In operation S550, the control unit 135 re-generates the file A by adding dummy data to an area of the previous cluster from which the data are deleted.

In operation S560, the control unit 135 fills with dummy data an area other than the copied data of the newly allocated cluster, and in operation S570, generates a file B by linking the newly allocated cluster with the cluster that follows the previous cluster in reading order, through the FAT.

Referring to FIG. 1B, the control unit 135 links the newly allocated cluster [a+7] with the cluster [a+1] which follows the previous cluster in reading order, so that the cluster [a+1] is read after the reading of the cluster [a+7]. More specifically, the control unit 135 stores the information about the cluster [a+1] in the FAT entry [a+7] to match the newly allocated cluster [a+7] so that the cluster [a+1] is read after the reading of the cluster [a+7].

FIG. 6 is a flowchart illustrating a file merge method according to an exemplary embodiment of the present general inventive concept.

The process of merging file A with file C and thus generating a new file A will be explained below.

In order to merge file C to the tail portion of file A, the control unit 135 in operation S610 checks, by using the FAT, the last cluster to read among the clusters of the file A.

In operation S620, upon checking the cluster, the control unit 135 adds dummy data to an empty portion of the data area of the checked cluster.

In operation S630, the control unit 135 checks, by using the FAT, the first cluster to read among the clusters of the file C.

Upon checking the cluster, the control unit 135 controls based on the FAT so that the last cluster to read among the clusters of file A and the first cluster among the clusters of file C are linked with each other. As a result, file A and file C are merged with each other, thereby generating a new file A.

The method to divide a file, and a method to merge files according to the present general inventive concept will be explained below, with reference to an example of a digital camcorder. However, this is only an example, and one will understand that this example should not be understood as limiting. Accordingly, the present general inventive concept is applicable to any device to employ a storage medium therein such as a digital camera, computer, portable media player (PMP), etc.

While one file is divided into two and two files are merged into one in explaining the method to divide or merge files according to the exemplary embodiment of the present general inventive concept, one will understand that a file can be divided into more than two files, and more than two files can be merged with each other.

Furthermore, while data of one cluster is copied in dividing or merging files according to the exemplary embodiment of the present general inventive concept, one will understand that data can be copied from one or more clusters in the process of dividing or merging files.

Furthermore, while a video file is explained as a subject of the file dividing or merging method according to the exemplary embodiment of the present general inventive concept, one will understand that any file other than the video file can be also applied as a subject of file dividing or merging.

Furthermore, while FAT32 of the FAT file system is applied as a reference in the process of dividing or merging files according to the exemplary embodiments of the present general inventive concept, one will understand that other references such as FAT12 or FAT16 is applicable.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the exemplary embodiments of the present general inventive concept, a file dividing or merging method to provide fast file editing is provided.

As a result, time delay due to a file copy process is avoided, and shortening of a lifespan of NAND flash is prevented. Time delay due to the file copy process is avoided because a portion of data of a divide point or merge point cluster is copied, instead of copying all the data after the divide point or merge point. The shortening of lifespan of the NAND flash is prevented because a writing process, which was required during the file copy process, is skipped.

Furthermore, a reserve capacity for purposes of editing is minimized. Because a portion of data of the divide point or merge point cluster is copied, instead of copying all the data after the divide point or merge point, the reserve capacity to copy can be reduced even to within one cluster, regardless of the divide point or merge point.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An electronic device, comprising:
a storing unit to store a file in a plurality of clusters;
a control unit to manage a file allocation table (FAT) to copy data in a first cluster comprising a divide point into a second cluster and to link a FAT entry corresponding to the second cluster to a third cluster comprising a data to be read after reading the copied data in the second cluster.

2. An electronic device, comprising:
a storing unit to store file A and B respectively in a first cluster and a second cluster;
a control unit to manage a file allocation table (FAT), to link a FAT entry corresponding to the first cluster to the second cluster without any data copying;
filling in a portion of an area of a first cluster corresponding to a merge area with dummy data,
wherein a last data of a data stream for file A is stored in the first cluster and a first data of a data stream for file B is stored in the second cluster,
and the first cluster and the second cluster comprise space to store data into.

3. A digital camcorder, comprising:
a storing unit to store a plurality of files in a plurality of clusters;
a photographing unit photoelectrically converts an optical signal being entered through a lens unit into an electrical signal and processes the electrical signal;
a lens unit forms an optical image of an object being photographed on an optical plane;
a lens driving unit drives the lens unit;
a pre-processing unit generates, outputs an electric signal that corresponds to the optical image formed on the optical plane and pre-processes the electric signal;
a digital signal processor(DSP) processes the pre-processed electric signal and outputs the processed electric signal to the back-end unit;
a control unit controls a digital camcorder operation according to user operation commands through a operating unit;
a operating unit includes a plurality of buttons to receive user commands;
a back-end unit encodes the processed electric signal and outputs the encoded electric signal to an output unit; and
an output unit displays the encoded electric signal,
wherein the digital camcorder operation is a file merge or a file divide using a file allocation table (FAT) and the control unit controls to manage the FAT, to copy data to be separated from the file in a first cluster comprising a dividing point into a second cluster and to link a FAT entry corresponding to the second cluster to a third cluster comprising data to be read after reading the copied data in the second cluster.

4. The digital camcorder of claim 3, wherein the video file is at least one of the processed electric signals encoded and not encoded.

5. The digital camcorder of claim 3, wherein the storing unit stores video file A and B respectively in a first cluster and a second cluster and,
the control unit controls to manage a FAT, to link a FAT entry corresponding to the first cluster to a FAT entry corresponding to the second cluster without any data copying, wherein the first cluster is a cluster storing a last data of a data stream for the video file A and the second cluster is a cluster storing a first data of a data stream for the video file B.

6. A method to divide a file stored in a plurality of clusters, the method comprising:
copying data to be separated from the file, in a first cluster comprising a dividing point into a second cluster;
linking a file allocation table (FAT) entry corresponding to the second cluster to a third cluster comprising data to be read after reading the copied data in the second cluster.

7. The method of claim 6, wherein the portion of the data in the first cluster is to be read after the remainder of the first cluster.

8. The method of claim 6, wherein the second cluster comprises:
a newly allocated cluster.

9. The method of claim 6, wherein the linking comprises:
storing information about the second cluster into the FAT entry corresponding to the first cluster.

10. The method of claim 6, further comprising:
deleting a portion of the data in the first cluster and filling in an area of the first cluster corresponding to the deleted portion of the data with dummy data.

11. The method of claim 6, further comprising:
filling in an area of the second cluster with dummy data and excluding an area having the copied data.

12. The method of claim 6, wherein the file is a video stream file.

13. A method to merge files A and B, the method comprising:
linking a file allocation table (FAT) entry corresponding to a first cluster into a second cluster without any data copying,
wherein a last data of a data stream for file A is stored in the first cluster and a first data of a data stream for file B is stored in the second cluster,
and the first cluster and the second cluster comprise space to store data into.

14. The method of claim 13, wherein the linking comprises:
storing information about the second cluster into the FAT corresponding to the first cluster.

15. The method of claim 13, wherein the first data of a data stream for file B is to be read after the last data of the data stream for file A.

16. The method of claim 13, further comprising:
filling in a portion of an area of a first cluster corresponding to a merge area with dummy data,
wherein the merge area is an area at which file A and B are intended to be joined.

17. The method of claim 16, wherein the portion of the area of the first cluster is an empty area.

18. A non-transitory computer-readable recording medium having embodied thereon a computer program to execute a method to divide a file, wherein the method comprises:
copying data to be separated from the file, in a first cluster comprising a dividing point into a second cluster;
linking a file allocation table (FAT) entry corresponding to the second cluster to a third cluster comprising data to be read after reading the copied data in the second cluster.

19. A non-transitory computer-readable recording medium having embodied thereon a computer program to execute a method to merge file A and B respectively stored in a first cluster and a second cluster, wherein the method comprises:
linking a file allocation table (FAT) entry corresponding to a first cluster into a second cluster without any data copying,
wherein a last data of a data stream for file A is stored in the first cluster and a first data of a data stream for file B is stored in the second cluster,
and the first cluster and the second cluster comprise space to store data into.

\* \* \* \* \*